United States Patent
Kashiwagi et al.

(10) Patent No.: US 7,962,927 B2
(45) Date of Patent: Jun. 14, 2011

(54) OPTICAL DISK

(75) Inventors: Toshiyuki Kashiwagi, Tokyo (JP);
Takeshi Yamasaki, Kanagawa (JP);
Tomomi Yukumoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 71 days.

(21) Appl. No.: 12/568,496

(22) Filed: Sep. 28, 2009

(65) Prior Publication Data

US 2010/0008212 A1    Jan. 14, 2010

Related U.S. Application Data

(62) Division of application No. 10/493,832, filed as application No. PCT/JP2003/010799 on Aug. 26, 2003, now Pat. No. 7,596,077.

(30) Foreign Application Priority Data

Aug. 30, 2002 (JP) .................................. 2002-254989

(51) Int. Cl.
*G11B 17/04* (2006.01)
*G11B 3/70* (2006.01)

(52) U.S. Cl. ........................................ 720/695; 369/283

(58) Field of Classification Search ............... 369/275.1, 369/280, 275.4, 284, 275.3, 286, 283; 720/718, 720/719, 720, 695, 725
See application file for complete search history.

(56) References Cited

U.S. PATENT DOCUMENTS

| | | |
|---|---|---|
| 4,957,776 A | 9/1990 | Higuchi et al. |
| 5,331,625 A | 7/1994 | Mieda et al. |
| 5,490,131 A | 2/1996 | Ohta et al. |
| 5,679,440 A | 10/1997 | Kubota |
| 5,876,823 A | 3/1999 | Nagashima |
| 6,067,285 A | 5/2000 | Ohta et al. |
| 6,246,656 B1 | 6/2001 | Kawakubo et al. |
| 6,353,592 B1 | 3/2002 | Kashiwagi et al. |
| 6,657,948 B1 | 12/2003 | Tajima et al. |
| 6,863,946 B2 | 3/2005 | Hisada et al. |
| 2002/0081460 A1 | 6/2002 | Feist et al. |
| 2002/0106476 A1 | 8/2002 | Hirai et al. |
| 2003/0008236 A1 | 1/2003 | Yamada et al. |
| 2003/0138728 A1 | 7/2003 | Saito |
| 2003/0152019 A1 | 8/2003 | Thompson et al. |

(Continued)

FOREIGN PATENT DOCUMENTS

JP       58-175150       10/1983

(Continued)

*Primary Examiner* — Allen T Cao
(74) *Attorney, Agent, or Firm* — Robert J. Depke; Rockey, Depke & Lyons, LLC

(57) ABSTRACT

The present invention relates to an optical disc for use as a recording medium in an optical disc drive, which has a transparent protection film (120) formed on a recording layer on one plane of the disc substrate (110) and a printing label film 130 being of approximately the same film quality and film structure as the transparent protection film (120) formed on the other plane thereof. The printing label film (130) is a synthetic resin film made mainly of polycarbonate and formed on the disc substrate by screen printing, etc. Thus, the optical disc has the same film quality and film structure on the respective one and the other planes, which prevents occurrence of skew caused by the deformation due to the asymmetry of the structure along the thickness direction of the optical disc. The optical disc has a function to present contents of information recorded therein with the printing label film provided on the other plane of the disc substrate.

12 Claims, 7 Drawing Sheets

U.S. PATENT DOCUMENTS

| | | | |
|---|---|---|---|
| 2005/0064114 A1* | 3/2005 | Matsubaguchi et al. | 428/32.24 |
| 2008/0123504 A1* | 5/2008 | Kakuta et al. | 369/94 |
| 2009/0092783 A1* | 4/2009 | Hara et al. | 428/64.8 |
| 2010/0020668 A1* | 1/2010 | Narumi et al. | 369/100 |
| 2010/0090358 A1* | 4/2010 | Furomoto et al. | 264/1.33 |
| 2010/0279053 A1* | 11/2010 | Tsuchino et al. | 428/64.5 |

FOREIGN PATENT DOCUMENTS

| | | |
|---|---|---|
| JP | 60-187951 | 9/1985 |
| JP | 01-182944 | 7/1989 |
| JP | 02-252120 | 10/1990 |
| JP | 05-242527 | 9/1993 |
| JP | 08-212595 | 8/1996 |
| JP | 09-180254 | 7/1997 |
| JP | 11-242829 | 9/1999 |
| JP | 2002-235736 | 8/2000 |
| JP | 2001-189034 | 7/2001 |
| JP | 2001-216683 | 8/2001 |
| JP | 2002-92955 | 3/2002 |
| JP | 2002-536778 | 10/2002 |
| JP | 2002-367234 | 12/2002 |
| WO | WO 99/00794 | 1/1999 |

* cited by examiner

OPTICAL DISK

The subject matter of application Ser. No. 10/493,832, is incorporated herein by reference. The present application is a Divisional of U.S. Ser. No. 10/493,832, filed Apr. 28, 2004, now U.S. Pat. No. 7,596,077, issued Sep. 29, 2009, which is a 371 U.S. National Stage filing of PCT application PCT/JP2003/10799, filed Aug. 26, 2003, which claims priority to Japanese Patent Application Numbers JP2002-254989 filed Aug. 30, 2002. The present application claims priority to these previously filed applications.

TECHNICAL FIELD

The present invention relates to an optical disc, such as a DVD (Digital Versatile Disk), a CD (Compact Disk), etc., for use as a recording medium in an information processing apparatus such as an optical disc drive, etc., and particularly relates to an optical disc which prevents deformation or planar deformation in the radius direction thereof from occurring and suppresses skew or leaning of an optical beam coming into the optical disc against the optical axis.

The application claims priority of Japanese Patent Application No. 2002-254989, filed on Aug. 30, 2002, the entirety of which is incorporated by reference herein.

BACKGROUND ART

Up to now, an optical disc for use as a recording medium in an information processing apparatus such as an optical disc drive is generally configured as shown in FIG. 1. An optical disc 11 shown in FIG. 1 includes a disc substrate 10 having a recording layer 12 formed on one plane thereof, and a transparent protection film 20 formed on the recording layer 12. The disc substrate 10 of the optical disc 11 has a center hole 14 formed at the center thereof. When the optical disc 11 is set up on a disc rotation drive unit provided on the optical disc drive, the center hole 14 engages with a centering member provided on the disc rotation drive unit, thereby the rotation center of the optical disc 11 corresponds to that of the disc rotation drive unit.

The recording layer 12 is formed on the optical disc 11 in various manners, for example, in such a manner that information pit sequences are formed along their concentrically shaped or spirally shaped recording tracks and thus formed information pit sequences are covered by a reflective film. For example, the thickness of the disc substrate 10 is around 1.1 mm and that of the transparent protection film 20 is around 0.1 mm.

Such optical disc 11 is set up on a turn table of the optical disc drive, not shown, the respective centers being brought together under centering, and is driven with a high-speed, while an optical beam L eradiated from an optical pickup comes into the recording layer 12 via the transparent protection film 20 so as to record information to the recording layer 12 or reproduce information recorded thereon.

It is necessary to favorably keep the flatness of the recording layer 12 of the optical disc so as to accurately record/reproduce information using the optical pickup in the condition that the optical disc is set up on the turn table of the optical disc drive and is rotated with a high-speed. In particular, to make the frequency of transmission signals higher so as to increase the recording density as well as the transfer rate of signals for recording/reproducing, it is necessary to suppress skew or leaning of the optical beam L coming into the optical disc against the optical axis, being raised by various kinds of factors. That is, deformation occurring in the radius direction of the optical disc is required to be prevented.

For example, according to the international publication WO99/00794, there is disclosed an optical disc in which a waterproofing film is formed on a certain plane thereof so as to prevent water from penetrating into the disc substrate, which can prevents deformation from occurring in the optical disc.

In addition to the water penetration, the influential factor of the deformation occurring in an optical disc is that, for example, one plane and the other plane of the optical disc 11 are of different layer structures and are made of different materials, thereby the disc substrate 10 is formed under the asymmetric structure along its thickness direction, as shown in FIG. 1.

DISCLOSURE OF THE INVENTION

The present invention has an object to overcome the above-mentioned drawbacks of the prior art by providing a new optical disc.

It is another object of the present invention to provide an optical disc which can prevent occurrence of deformation caused by the different layer structures of one plane and the other plane of the optical disc, thereby can prevent skew from occurring when the optical disc is set up on an optical disc drive.

The above object can be attained by providing an optical disc according to the present invention including: a disc substrate having a recording layer formed on one plane thereof; a transparent protection film provided on the recording layer formed on one plane of the disc substrate; a printing label film provided on the other plane of the disc substrate, having a function of reducing skew due to the film quality and film structure corresponding to the transparent protection film and an information presenting function by label printing.

According to the optical disc of the present invention, asymmetry between one plane and the other plane of the optical disc is eliminated by the printing label film provided on the other plane of the disc substrate which has the transparent protection film on the recording layer formed on one plane thereof.

The optical disc according to the present invention can efficiently prevent skew caused by the asymmetry between the layer structures of the disc substrate along the thickness direction so that the flatness of the recording layer can be favorably maintained, which can realize the constant stable recording/reproducing operation.

As a result, the optical disc medium can adapt to increased recording density and increased transfer rate of signals for recording/reproducing.

These objects and other objects, features and advantages of the present invention will become more apparent from the following detailed description of the preferred embodiments of the present invention.

BEST MODE FOR CARRYING OUT THE INVENTION

An optical disc according to the present invention will be described in detail with reference to the accompanying drawings. Note that the optical disc according to the present invention is used as a recording medium in an information processing apparatus such as an optical disc drive, etc.

Figure 2:
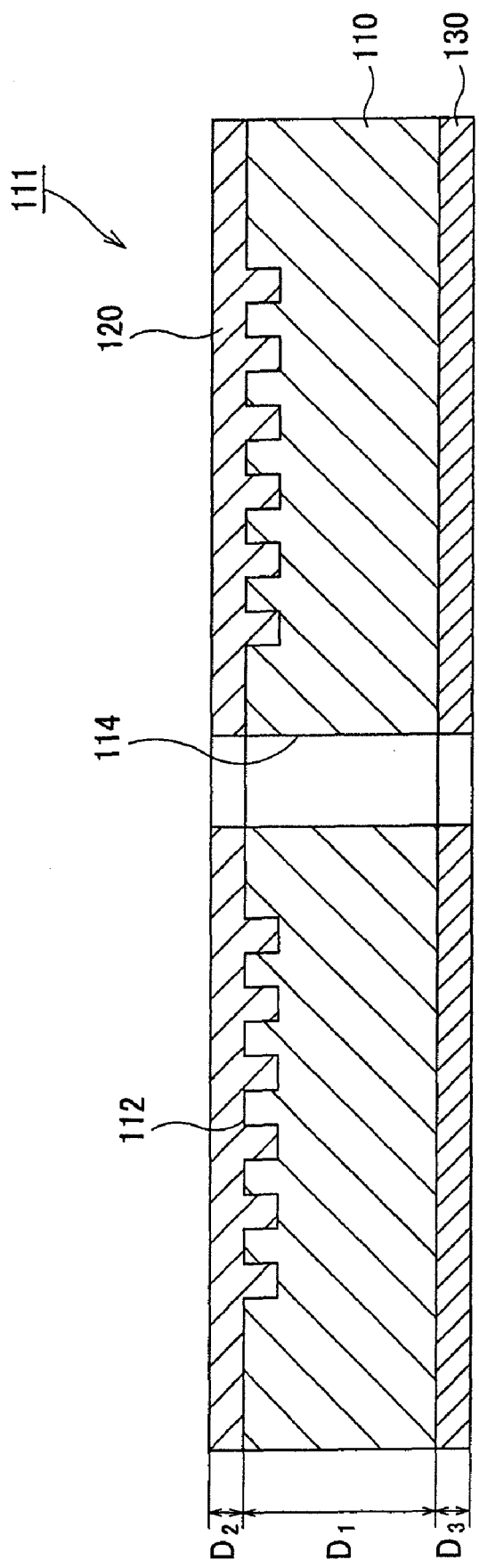
FIG. 2 shows a cross sectional view of the first embodiment of an optical disc according to the present invention.

FIG. 2 shows a cross sectional view of the first embodiment of the optical disc according to the present invention.

An optical disc 111 shown in FIG. 2 includes a disc substrate 110 made of acrylic synthetic resin, etc., having a recording layer 112 on one plane thereof, and a transparent protection film 120 formed on the recording layer 112. Furthermore, the disc substrate 110 includes a printing label film 130 formed on the other plane thereof.

Meanwhile, the disc substrate 110 has a center hole 114 formed at the center thereof. When the optical disc 111 is set up on a disc rotation drive unit provided on an optical disc drive, the center hole 114 engages with a centering member provided on the disc rotation drive unit, thereby the rotation center of the optical disc 111 corresponds to that of the disc rotation drive unit.

The recording layer 112 provided on one plane of the disc substrate 110 is formed in such a manner that information pit sequences of concavo-convex pit pattern are formed along recording tracks, and thus formed information pit sequences are covered by a reflective film.

The transparent protection film 120 formed on the recording layer 112 is a synthetic resin film made mainly of thermoplastic synthetic resin through which light can transmit such as polycarbonate, etc. covering the recording layer 112 of the disc substrate 110.

The printing label film 130 formed on the other plane of the disc substrate 110 is a synthetic resin film made mainly of thermoplastics synthetic resin through which light can transmit such as polycarbonate, etc., similar to the transparent protection film 120. More specifically, the printing label film 130 is formed in such a manner that colored paste polycarbonate to which ink is added is printed on the other plane of the disc substrate 110, under screen printing method. The printing label film 130, which is formed by printing one or plural kinds of colored paste polycarbonate, works as an information presenting part which presents names of contents and works recorded on the optical disc 111 and identification information such as label names.

Note that the area of the printing label film 130 formed on the other plane of the disc substrate 110 generally covers the whole area of the other plane of the disc substrate 110, and approximately corresponds to that of the transparent protection film 120 formed on one plane of the disc substrate 110.

The optical disc 111 according to the present invention is formed with the diameter of approximate 120 mm, and the disc substrate 110 thereof is formed with thickness $D_1$ of approximate 1.1 mm. The transparent protection film 120 on the recording layer 112 is formed with thickness $D_2$ of approximate 0.1 mm and the printing label film 130 on the other plane of the disc substrate 110 is formed with thickness $D_3$ of approximate 0.1 mm. That is, the whole thickness of the optical disc 111 according to the present invention is approximate 1.2 to 1.3 mm.

In the optical disc 111 according to the present invention, an optical beam comes into one plane of the disc substrate 110 having the transparent protection film 120 formed thereon, which reads information recorded on the recording layer 112 or writes information to the recording layer 112.

In the optical disc 111 shown in FIG. 2 according to the present invention, the printing label film 130, which is made mainly of synthetic resin similar to the material of the transparent protection film 120 and is of thickness approximately equal to that of the transparent protection film 120, is provided on a plane opposite to the plane having the recording layer 112 on the disc substrate 110, thus the optical disc 111 whose both sides are of the same structure becomes substantially symmetric when the top side and the back side are compared. That is, in the optical disc 111, asymmetry of the structure along the thickness direction of the disc substrate 110 is eliminated, so that deformation or planner deformation, especially in the radius direction, is prevented from occurring. Since occurrence of deformation can be suppressed as described above, when the optical disc 111 is set up on the optical disc drive to record/reproduce information, an optical beam eradiated from the optical pickup provided on the optical disc drive can be kept perpendicular to the optical disc 111, thereby occurrence of skew can be prevented.

In the optical disc 111 described above, the transparent protection film 120 and the printing label film 130 are formed using thermosetting synthetic resin material such as polycarbonate, etc., however, other material such as ultraviolet curing resin may be also used. Furthermore, it is not necessary to use the same synthetic resin material for both the transparent protection film 120 and the printing label film 130, that is, synthetic resin materials having similar characteristic to some extent may be used.

The second embodiment of the optical disc according to the present invention is explained hereinafter referring to FIG. 3.

Figure 3:
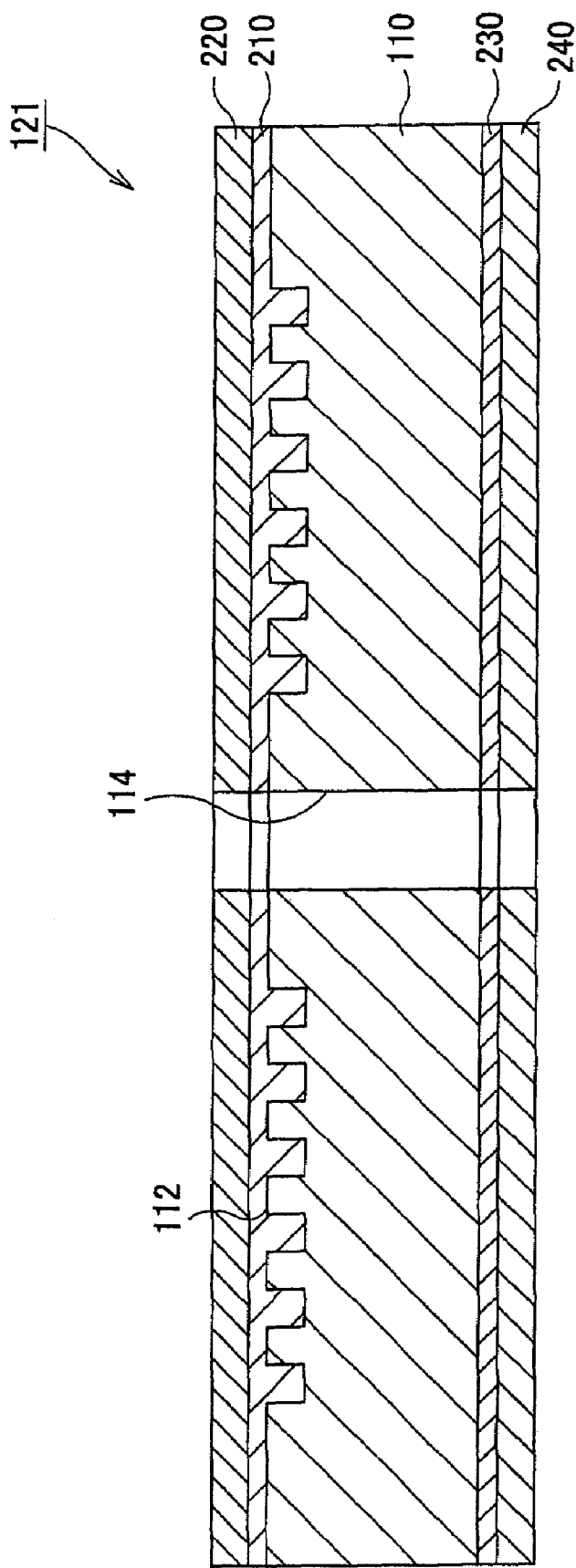
FIG. 3 shows a cross sectional view of the second embodiment of an optical disc according to the present invention.

In FIG. 3, parts or components similar to those of the optical disc 111 shown in FIG. 2 are indicated with the same reference numerals.

The optical disc 121 shown in FIG. 3 is formed in such a manner that a transparent protection film 220 is provided on the recording layer 112 formed on one plane of the disc substrate 110, being adhered with adhesive material 210 attached therebetween, while a printing label film 240 is provided on the other plane of the disc substrate 110, being adhered with adhesive material 230 attached therebetween.

The transparent protection film 220 and the printing label film 240 are synthetic resin films made mainly of polycarbonate, etc., which are stuck on one and the other planes of the disc substrate 110, being adhered with the adhesive materials 210 and 230, respectively.

On the surface of the printing label film 240, names of contents and works recorded on the optical disc 111 and identification information such as label names, etc. are provided by printing.

Figure 1:
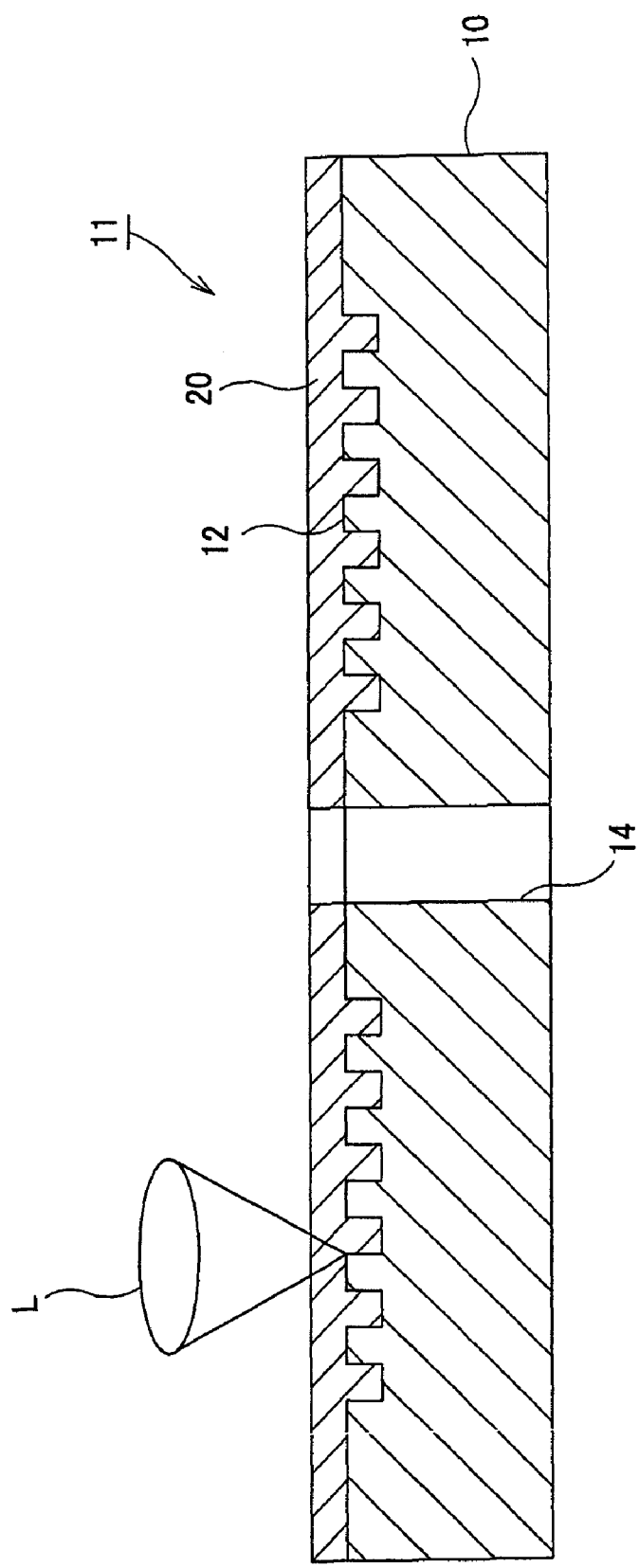
FIG. 1 shows a cross sectional view of a conventional optical disc.

The optical disc 121 shown in FIG. 3 is formed with the diameter of approximate 120 mm, and the transparent protection film 220 and the printing label film 240 thereof are formed with thickness of 0.1 mm, respectively, thus the whole thickness of the optical disc 121 is approximate 1.2 mm to 1.3 mm, similar to the optical disc 111 shown in FIG. 1.

Note that also in the optical disc 121, one plane having the transparent protection film 220 is set to be a plane for recording/reproducing, into which optical beam comes.

Since the optical disc 121 shown in FIG. 3 is also provided with the transparent protection film 220 and the printing label film 240, both of which are made of the same material and have approximate equal thickness, and which are stuck on the respective planes of the disc substrate 110, being adhered with the adhesive materials 210 and 230, respectively, the disc substrate 110 has the films of approximately the same structure on the both planes thereof. Thus, the optical disc 121 shown in FIG. 3 whose both sides are of the same structure becomes substantially symmetric when the top side and the back side are compared. That is, in the optical disc 121, asymmetry of the structure along the thickness direction of the disc substrate 110 is eliminated, so that deformation, especially in the radius direction, is prevented from occurring. Since occurrence of deformation can be suppressed as described above, when the optical disc 121 is set up on the optical disc drive to record/reproduce information, an optical beam eradiated from the optical pickup provided on the optical disc drive can be kept perpendicular to the optical disc 121, thereby occurrence of skew can be prevented.

Also in the optical disc 121 in this embodiment, the transparent protection film 220 and the printing label film 240 are formed using thermosetting synthetic resin material such as polycarbonate, etc., however, other material such as ultraviolet curing resin may be also used. Furthermore, it is not necessary to use the same synthetic resin material for both the transparent protection film 220 and the printing label film 240, that is, synthetic resin materials having similar characteristic to some extent may be used.

The third embodiment of the optical disc according to the present invention is explained hereinafter referring to FIG. 4.

Figure 4:
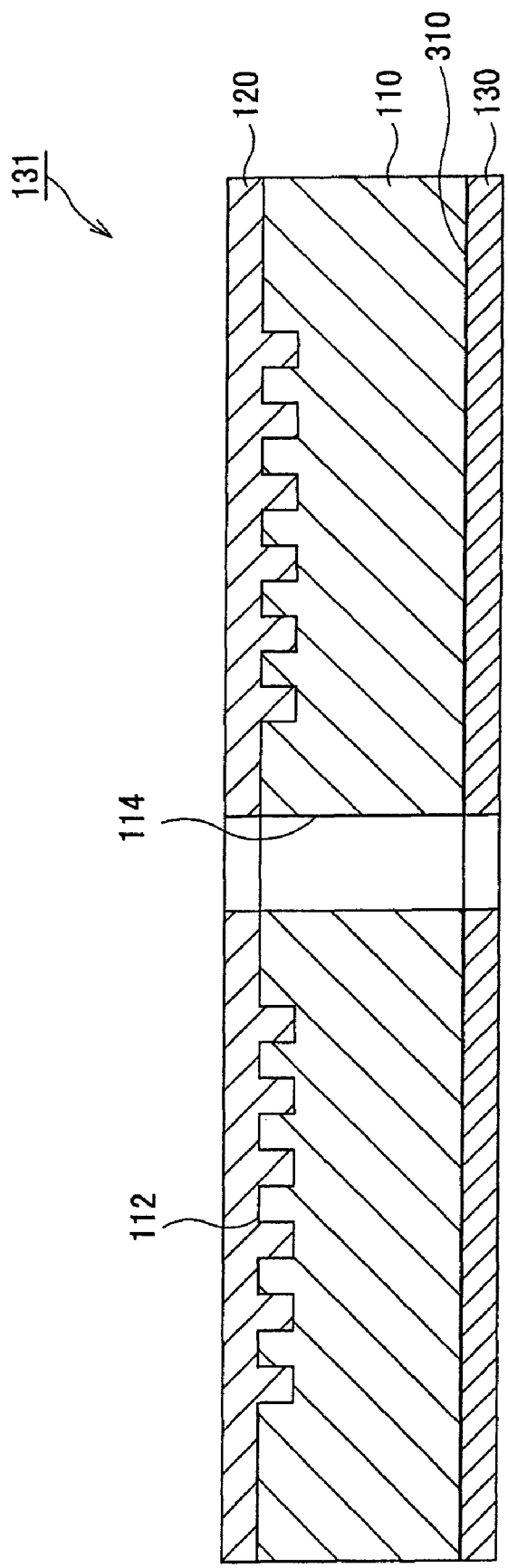
FIG. 4 shows a cross sectional view of the third embodiment of an optical disc according to the present invention.

In FIG. 4, parts or components similar to those of the optical disc 111 shown in FIG. 2 are indicated with the same reference numerals, and detailed explanation of which will be omitted.

An optical disc 131 shown in FIG. 4 is formed in such a manner that a moisture-proof film 310 is also provided between the other plane of the disc substrate 110 and the printing label 130 of the optical disc 111 shown in FIG. 2. The moisture-proof film 310 is made of metal or alloyed metal of Al, Au, Ag, Ni, Cr, Cu, Pt, Ti, etc., stainless-steel alloy, dielectric material of $SiN_x$, $SiO_x$, $SiN_xO_y$, SiC, etc., or organic material. When the moisture-proof film 310 is made of metal such as Al, etc., Vapor Deposition is used.

Being provided with the moisture-proof film 310, the optical disc 131 shown in FIG. 4 can prevent moisture from invading into the inside of the disc substrate 110, thus occurrence of deformation can be prevented.

In the optical disc 131 shown in FIG. 4, the moisture-proof film 310 may be preferably made of the same material as the reflective film being the recording layer 112. Here, both of the moisture-proof film 310 and the reflective film of the recording layer 112 are made of Al. Since the reflective film and the moisture-proof film 310 are made of the same material, the disc substrate 110 has the films of approximately the same structure on the both planes thereof. Thus, the optical disc 131 shown in FIG. 4 whose both sides are of the same structure becomes substantially symmetric when the top side and the back side are compared, and deformation can be more reliably prevented from occurring. Hence, when the optical disc 131 is set up on the optical disc drive to record/reproduce information, an optical beam eradiated from the optical pickup provided on the optical disc drive can be kept perpendicular to the optical disc 131, thereby occurrence of skew can be prevented.

The fourth embodiment of the optical disc according to the present invention is explained hereinafter referring to FIG. 5.

Figure 5:
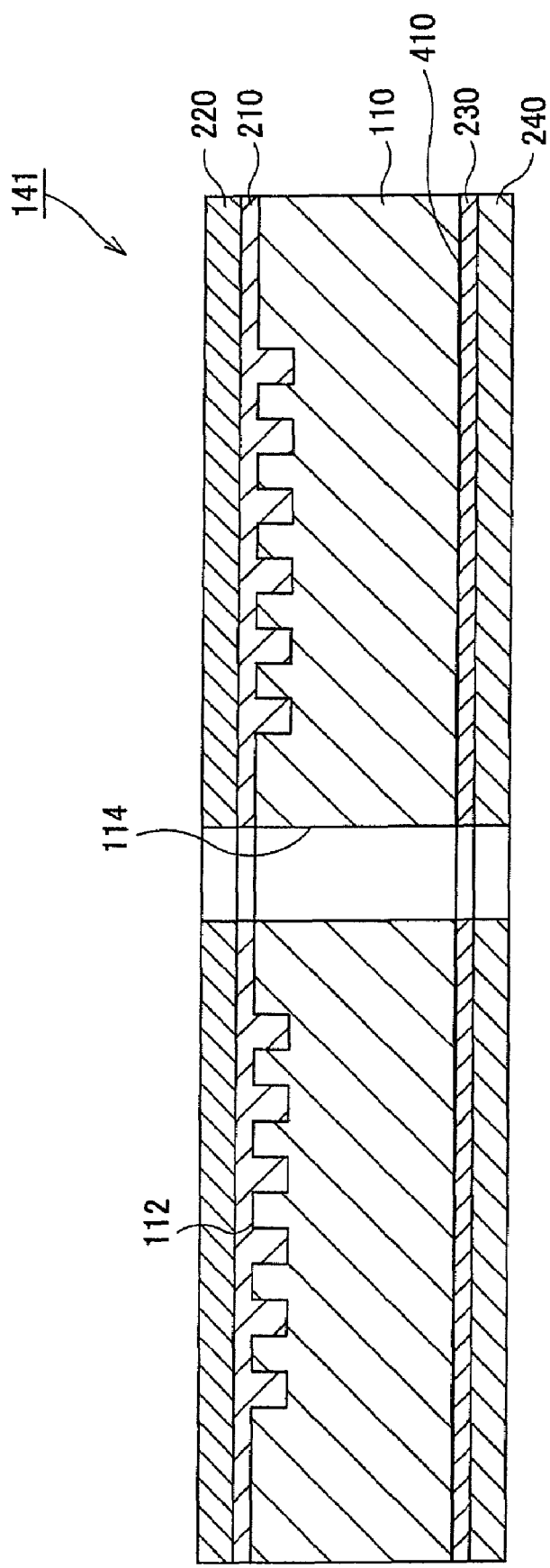
FIG. 5 shows a cross sectional view of the fourth embodiment of an optical disc according to the present invention.

In FIG. 5, parts or components similar to those of the optical disc 121 shown in FIG. 3 are indicated with the same reference numerals, and detailed explanation of which will be omitted.

An optical disc 141 shown in FIG. 5 is formed in such a manner that a moisture-proof film 410 is also provided between the other plane of the disc substrate 110 and the adhesive material 230 in the optical disc 121 shown in FIG. 3. The moisture-proof film 410 is made of metal or alloyed metal of Al, Au, Ag, Ni, Cr, Cu, Pt, Ti, etc., stainless-steel alloy, dielectric material of $SiN_x$, $SiO_x$, $SiN_xO_y$, SiC, etc., or organic material.

Being provided with the moisture-proof film 410, the optical disc 141 also can prevent moisture from invading into the inside of the disc substrate 110, occurrence of deformation can be prevented.

Also in the optical disc 141 shown in FIG. 5, the moisture-proof film 410 may be preferably made of the same material as the reflective film being the recording layer 112. Here, both of the moisture-proof film 410 and the reflective film of the recording layer 112 are made of Al. Since the reflective film and the moisture-proof film 410 are made of the same material, the disc substrate 110 has the films of approximately the same structure on the both planes thereof. Thus, the optical disc 141 shown in FIG. 5 whose both sides are of the same structure becomes substantially symmetric when the top side and the back side are compared, and deformation can be more reliably prevented from occurring. Hence, when the optical disc 141 is set up on the optical disc drive to record/reproduce information, an optical beam eradiated from the optical pickup provided on the optical disc drive can be kept perpendicular to the optical disc 141, thereby occurrence of skew can be prevented.

The optical discs 131, 141 described above are provided with the moisture-proof films 310, 410 and the printing label films 130, 240, respectively, while the optical discs 131, 141 may be provided with solely the moisture-proof films 310, 410, which also work as the printing label films by printing information thereon.

The fifth embodiment of the optical disc according to the present invention is explained hereinafter referring to FIG. 6.

Figure 6:
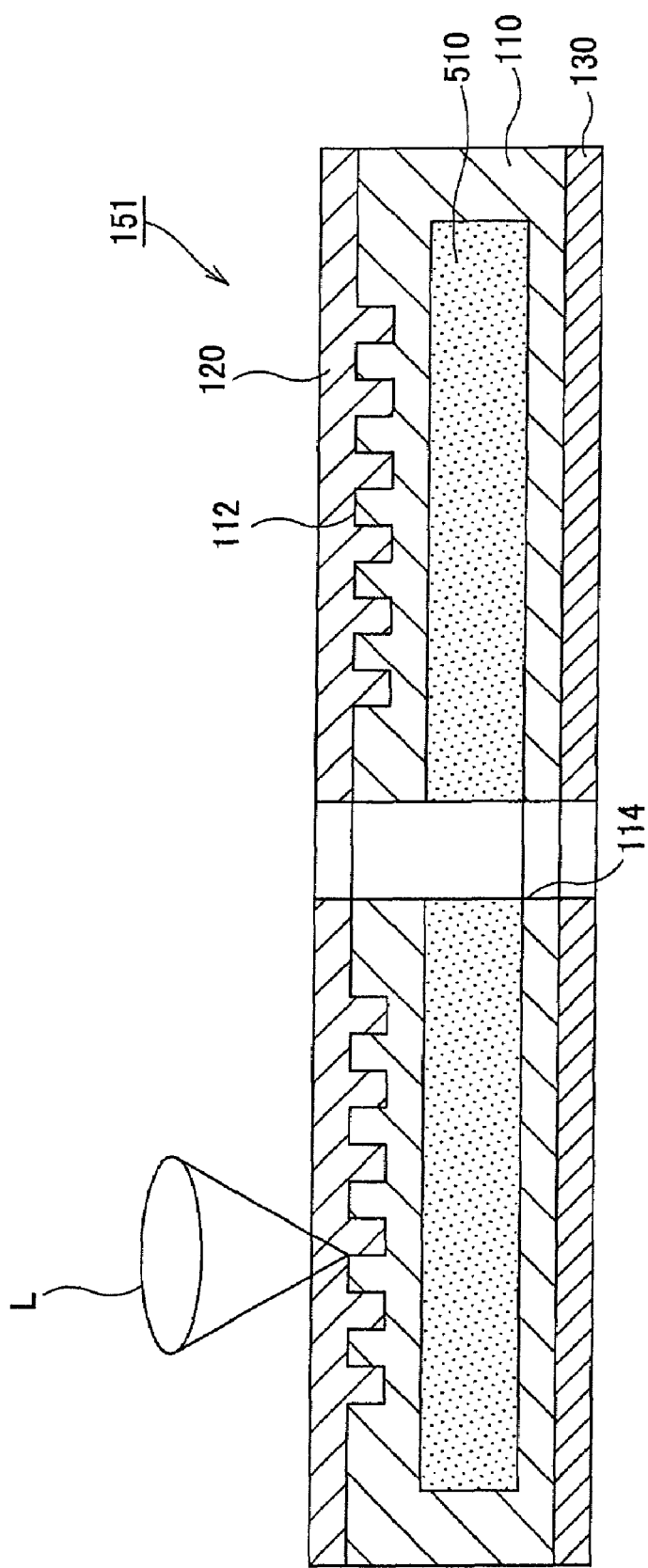
FIG. 6 shows a cross sectional view of the fifth embodiment of an optical disc according to the present invention.

In FIG. 6, parts or components similar to those of the optical disc 111 shown in FIG. 2 are indicated with the same reference numerals, and detailed explanation of which will be omitted.

An optical disc 151 shown in FIG. 6 is formed such that a water penetration protection layer 510 with low hydraulic permeability is also provided inside of the disc substrate 110 of the optical disc 111 shown in FIG. 2. The disc substrate 110 is formed by coinjection molding technique, etc., in which a material with low hydraulic permeability is embedded inside of the disc substrate 110 so as to reduce the water penetration thereinto and prevent occurrence of deformation in the optical disc 151.

In the optical disc 151 shown in FIG. 6, by giving additive such as metal foils, etc. into the water penetration protection layer 510 provided inside of the disc substrate 110, the exterior appearance of the disc substrate 110 may be improved since it has marble pattern, etc.

Such water penetration protection layer 510 may be provided also inside of the disc substrate 110 of the optical disc 121 shown in FIG. 3.

The change of skew values of the optical discs according to the present invention and that of a conventional optical disc are measured, and the result is described hereinafter.

Here, in the measurement, the optical disc 11 configured as shown in FIG. 1 and the optical disc 111 shown in FIG. 2 according to the present invention and the optical disc 131 shown in FIG. 4 also according to the present invention are used.

Skew values are measured in a manner as is stated below. Firstly, a reference skew value is determined in the state in which the optical disc is set up on a turn tale being the basis and rotated in a certain speed and an optical beam perpendicularly comes into the recording layer from the side of a plane having the transparent protection film of the disc substrate. Based on the reference skew value, when the optical disc is deformed in the radius direction and along the direction of the incoming optical beam, that is, deformed toward the side opposite to that where the optical beam is eradiated, the value is set to be "+", on the other hand, when the optical disc is deformed in the radius direction along the opposite direction of the incoming optical beam, that is, deformed toward the side where the optical beam is eradiated, the value is set to be "−".

When measuring skew values, the respective optical discs 11, 111, 131 are left for a certain period till the both planes of those discs become parallel with each other, under the environment (in a tank with constant temperature and humidity) in which the temperature is set to be 25 degree Celsius and the humidity is set to be 50 percent. The period is generally around three days.

Subsequently, the respective optical discs 11, 111, 131, the respective both planes of which become parallel with each other, are moved to and left under the environment (in a tank with constant temperature and humidity) in which the temperature is set to be 25 degree Celsius and the humidity is set to be 90 percent. Then, after a skew value of the measurement starting point is set to be "0", the temporal change of the skew value is measured. The result of the measurement is shown in the FIG. 7.

Note that skew values are measured at a point distant by 55 mm from the centers of the respective optical discs 11, 111, 131 whose diameters are 120 mm.

Figure 7:
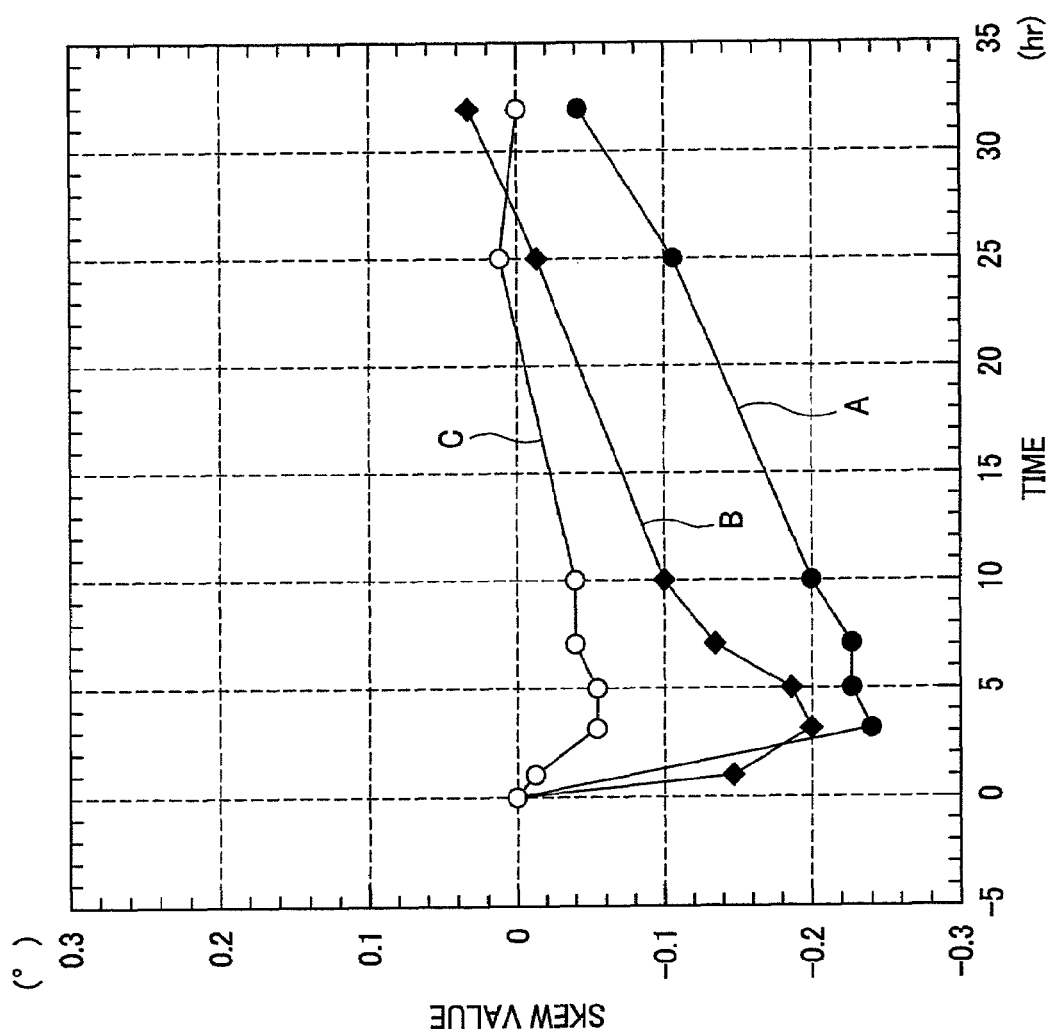
FIG. 7 is a graph showing temporal change of skew values of optical discs according to the present invention and that of a conventional disc.

In FIG. 7, the horizontal axis shows elapsed time, and the vertical axis shows skew values indicative of the angle of inclination of an optical disc against the optical axis of an optical beam coming into the optical disc.

In FIG. 7, "A" shows the change of skew value of the conventional optical disc 11 shown in FIG. 1, "B" shows that of the optical disc 111 shown in FIG. 2 which is provided with the printing label film 130 on the other plane of the disc substrate 110, and "C" shows that of the optical disc 131 which is provided with the moisture-proof film 310 between the disc substrate 110 and the printing label film 130.

As is obvious from the result shown in FIG. 7, under the changed environment, the conventional optical disc 11 still has the skew after a certain time elapsed. On the other hand, as for the optical discs 111, 131 according to the present invention, having the transparent protection film 120 formed on one plane of the disc substrate 110 and the printing label film 130 being of the same film quality and film structure as the transparent protection film 120 formed on the other plane thereof, the skew value become approximately "0" after a certain time elapsed under the changed environment. Especially, the optical disc 131 according to the present invention, which is provided with the moisture-proof film 310 made of the same material as the reflective film being the recording layer 112 as well as the printing label film 130, has the minimum change in the skew value under the changed environment. Thus, as for the optical discs 111, 131 according to the present invention, even though the environment is changed, deformation in the radius direction is removed after a certain time elapsed.

As described above, the optical disc according to the present invention is provided with the transparent protection film formed on one plane of the disc substrate having the recording layer and the printing label film being of the same structure as the transparent protection film formed on the other plane thereof, and has the symmetric structure along the thickness direction, occurrence of skew is prevented so that recording density and transfer rate can be increased.

While the invention has been described in accordance with certain preferred embodiments thereof illustrated in the accompanying drawings and described in the above description in detail, it should be understood by those ordinarily skilled in the art that the invention is not limited to the embodiments, but various modifications, alternative configurations or equivalents can be implemented without departing from the scope and spirit of the present invention as set forth and defined by the appended claims.

INDUSTRIAL APPLICABILITY

In the optical disc according to the present invention, since a transparent protection film is provided on a recording layer formed on one plane of a disc substrate and a printing label film being of the same film quality and film structure as the transparent protection film and having a function of reducing skew and an information presenting function by printing is provided on the other side of the disc substrate, the asymmetry in the respective planes thereof can be eliminated, thereby skew can be effectively suppressed so that the flatness of the recording layer is favorably maintained and thus the constant stable recording/reproducing operation is performed. Thus, the optical disc according to the present invention can adapt to increased recording density and increased transfer rate of signals for recording/reproducing.

The invention claimed is:

1. An optical disc comprising:
   a disc substrate having at least one surface thereof acting as a recording layer for storing information;
   and one or more layers formed over the recording layer such that for each sequential layer formed over the recording layer surface side of the disc substrate, a corresponding sequential layer is formed over the opposite side of the disc substrate having substantially the same film quality and substantially the same film thickness as the corresponding layer formed over the recording layer surface side;
   wherein at least one of said layers formed over the recording layer surface side is a transparent protection film provided over the recording layer side of the disc substrate; and
   wherein a film corresponding to the transparent protection film and formed over the opposite side of the disc substrate is a printing label film and further comprising a moisture barrier layer.

2. The optical disc according to claim 1, wherein the transparent protection film is a synthetic resin sheet which is stuck on one plane of the disc substrate, being adhered through adhesive material, and the printing label film is a synthetic resin sheet which is stuck on the other plane of the disc substrate, also being adhered through adhesive material.

3. The optical disc according to claim 2, wherein the synthetic resin sheets are made mainly of thermoplastic polymer through which light can transmit.

4. The optical disc according to claim 1, wherein the transparent protection film is a synthetic resin layer directly layered on the recording layer formed on the disc substrate, and the printing label film is a synthetic resin layer directly printed on the other plane of the disc substrate.

5. The optical disc according to claim 4, wherein the synthetic resin layers are made mainly of thermoplastic polymer through which light can transmit.

6. The optical disc according to claim 1, wherein at least one of said layers formed over the recording layer surface side of the substrate is a metallic reflective layer.

7. The optical disc according to claim 1, wherein a water penetration protection layer with low hydraulic permeability is provided inside of the disc substrate.

8. The optical disc according to claim 1, wherein only one surface side of the disc substrate contains a recording layer.

9. The optical disc according to claim 1, wherein said printing label film and said transparent protection film are formed using polycarbonate.

10. The optical disc according to claim 9, wherein said polycarbonate is a colored paste polycarbonate.

11. The optical disc according to claim 2, wherein said adhesive layers are formed having substantially the same film quality and substantially the same film thickness.

12. The optical disc according to claim 6, wherein said metallic reflective layer and said moisture-proof film are formed of the same material.

* * * * *